UNITED STATES PATENT OFFICE.

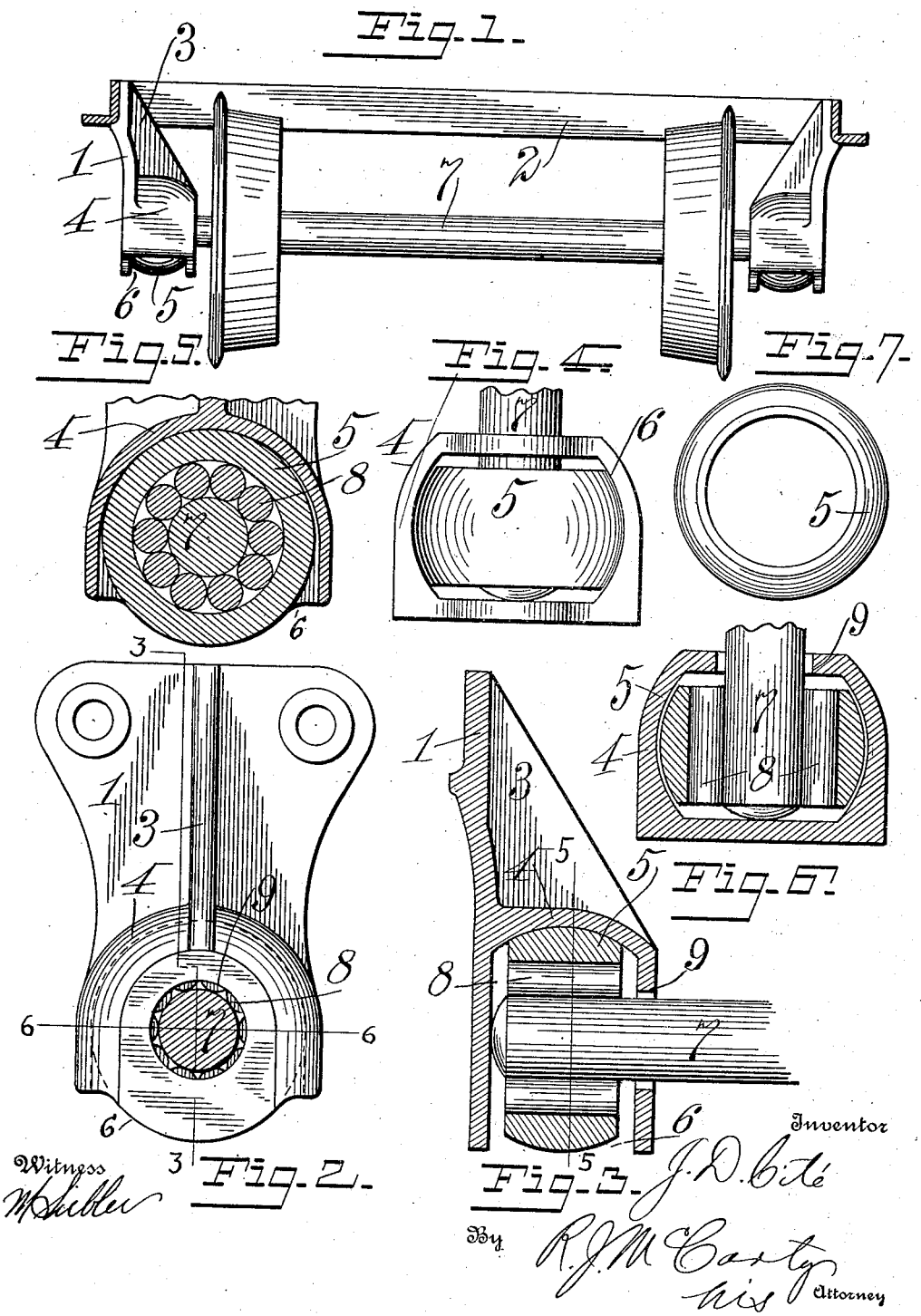

JOSEPH D. CITÉ, OF DAYTON, OHIO, ASSIGNOR TO INTERNATIONAL CLAY MACHINERY CO., OF DAYTON, OHIO.

AXLE-BEARING.

1,290,511.  Specification of Letters Patent.  Patented Jan. 7, 1919.

Application filed October 12, 1917. Serial No. 196,321.

*To all whom it may concern:*

Be it known that I, JOSEPH D. CITÉ, a citizen of the United States, residing at Dayton, in the county of Montgomery and State of Ohio, have invented certain new and useful Improvements in Axle-Bearings, of which the following is a specification.

This invention relates to certain improvements in bearings for the axles of trucks or cars. More particularly the bearings are designed for use in connection with cars used for transporting brick in brick-making plants. In such places the car tracks are more or less imperfect in their laying, there being more or less variation in the elevation of the rails and, therefore, it is desirable that the bearings for the axles of such cars shall be free to compensate or vary in accordance with the amount of deflection that is imparted to the axles of the car due to such unevenness or lack of uniformity in track elevation and plane. The present invention has for its object to provide an axle bearing for cars of this character which has both a maximum of anti-friction and a facility for oscillating in planes both parallel and transverse and in fact any plane between planes that are parallel and transverse to the line of the axle of the car. In other words, the axle bearing is of the ball and socket or universal bearing type with an elimination of a certain amount of the contacting surface between the two members whereby friction at some points is avoided, and the parts of the bearing may be easily disassembled and put together. The invention consists of the parts and their combination and construction as will hereinafter appear from the description and the claims to follow and in connection with the accompanying drawings.

In the accompanying drawings which form part of the description to follow and upon which like reference characters indicate similar parts as they are illustrated in the drawings, Figure 1 is an end elevation of a car truck having my improved axle bearing in position thereon. Fig. 2 is an inner side elevation of the bearing intact, detached from the truck or car frame. Fig. 3 is a sectional view on the line 3—3 of Fig. 2. Fig. 4 is a bottom plan view of one of the bearings intact with the axle broken away to facilitate space. Fig. 5 is a sectional view on the line 5—5 of Fig. 3. Fig. 6 is a sectional view on the line 6—6 of Fig. 2. Fig. 7 is an end view of the ball or inner bearing member.

As hereinbefore stated, the invention is designed to afford the greatest range of oscillation of the bearing around the end of the shaft or axle which is received therein. This is important for the reasons hereinbefore stated; due to the imperfect alinement of the rails forming the track over which the car is moved and which are usually light. These cars, as before intimated, are used for transporting clay products in their making, such as bricks, tile, etc., for example in transporting the product in the green state to the kilns for drying the same.

Having these ends in view the particular description of the bearing is as follows: 1 designates a bracket which is rigidly attached to the truck or car frame 2. This bracket is strengthened or reinforced by a longitudinal rib 3 which is a well known expedient in the molders' art. The lower portion thereof terminates in a shell or housing which constitutes the outer member of the bearing. This shell or housing 4 is of spherical form which spherical form extends from the upper portion thereof into the sides thereof. The top and sides form a rounded interior contacting surface which incloses the ball or inner member 5 of the bearing. The lower portion of the shell or housing 4 is omitted or removed so that the bottom thereof is open as at 6, therefore, no friction or resistance is offered to the ball member 5 in the lower portion of the housing. As shown in Fig. 4 the ball member 5 of the bearing is exposed through the open bottom of the shell, the upper portion thereof being in contact with the upper rounded portion of the said housing, as is clearly shown in Fig. 5 of the drawings. The ball member of the bearing may be easily removed through the opening in the bottom of the shell or housing and replaced when it is desired to clean the bearing, and owing to the removal of the entire lower portion of the housing, the ball is free to oscillate with a considerable less amount of friction than is the case with the usual ball and socket bearing. It will be apparent that the ball member 5 is free to oscillate in any plane parallel to the line of the axle 7; both in perpendicular and transverse planes as well as any plane between these two planes of oscillation. Therefore, it follows that a maximum of compensation is provided in the bearing for all inequalities or irregularities of the track. The axle 7 has a direct bearing in a series of roller bearings 8 which are assembled on the interior of the ball member of the bearing and these, together with the elimination of the lower portion of the housing 4, provide a minimum of frictional resistance at all degrees of oscillation which the axle may demand in passing over the car track. The opening 9 in the housing through which the axle projects in finding its bearing is amply large to enable the greatest amount of oscillation of the ball 5. The removal of the lower portion of the housing 4 or outer member of the bearing not only eliminates a substantial amount of friction between the two members but at the same time it does not detract any from the universal movement peculiar to a ball and socket bearing. The open bottom of the housing 4 also provides ample means for preventing the bearing from clogging up with dirt and the efficiency thereof becoming retarded to a greater or less extent thereby, and as before stated the inner member of the bearing may be easily removed through the bottom of the housing. The car tracks in brick kilns are usually not laid by expert trackmen. The conditions are such that it would be impossible to lay such track perfectly owing to the lack of a proper road bed and other causes well known to the brick-making art. Therefore, not only is there found inequalities in the track due to higher and lower elevation of parts, but often side deflections are present in these tracks and it is these various irregularities that render necessary a bearing of the character described and shown, and which provides for any oscillation of the bearing that may be demanded by the axle, thus preventing damaging stress or strain upon the axle or bearing, and insuring an easy running of the car.

Having described my invention, I claim:

1. The combination with a car axle, of a bearing therefor consisting of a housing the interior top and side walls thereof being of a substantially spherical form and the bottom portion thereof being open, and an inner bearing member of spherical form within said housing, the lower side of said inner bearing member being uninclosed at the bottom of the housing, whereby it is subject to a universal movement within the housing with a substantial curtailment of frictional engagement with said housing.

2. The combination with a car axle, of a bearing therefor consisting of an outer housing or socket member the interior top and side walls thereof being of a continuous spherical form and the bottom thereof being open throughout its width, a ball constituting an inner bearing member within said housing and adapted to have a universal range of movement therein, the lower side of said ball or inner member being exposed through the opening in the housing and said inner member having a series of roller bearings arranged therein which receive the car axle.

In testimony whereof I affix my signature.

JOSEPH D. CITÉ.

Copies of this patent may be obtained for five cents each, by addressing the "Commissioner of Patents, Washington, D. C."